July 10, 1934.  H. W. OTIS  1,966,308
VEHICLE CHECK
Filed Aug. 7, 1933
Fig.1.
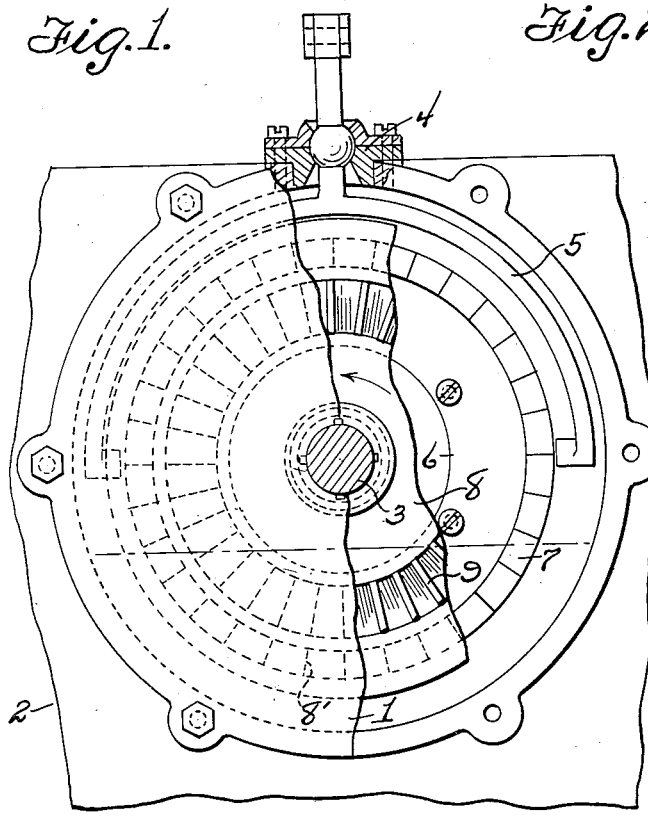
Fig.2.
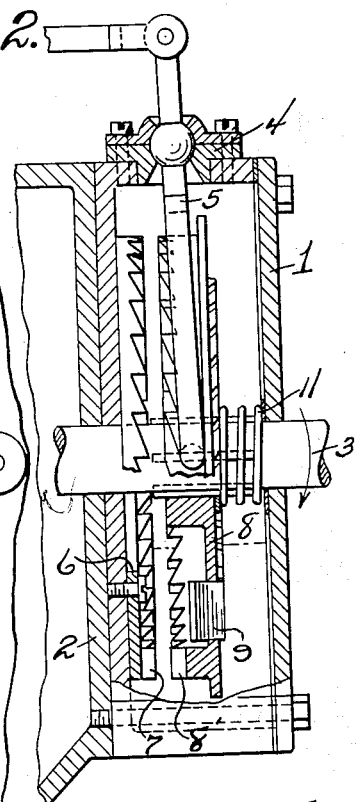
Fig.3.
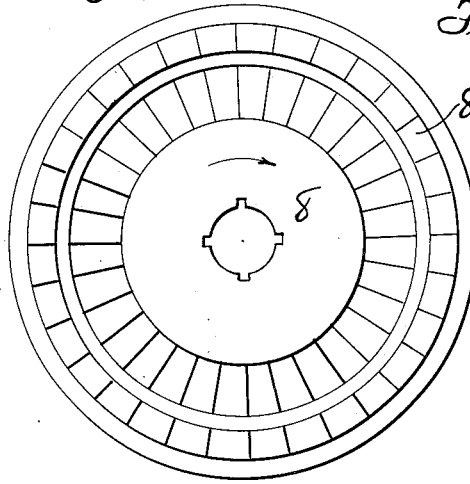
Fig.4.
Fig.5.
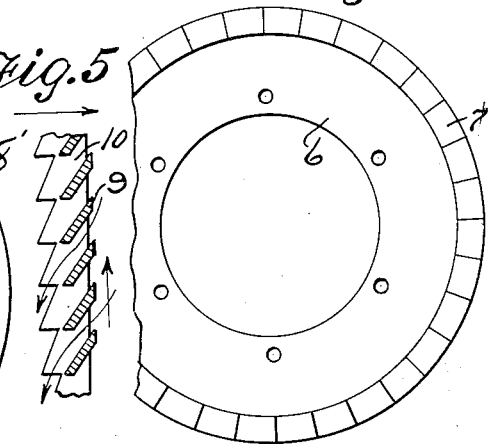
Harry W. Otis INVENTOR
BY Victor J. Evans & Co.
ATTORNEY Patented July 10, 1934

1,966,308

UNITED STATES PATENT OFFICE 1,966,308

VEHICLE CHECK

Harry W. Otis, South Pasadena, Calif.

Application August 7, 1933, Serial No. 684,079

4 Claims. (Cl. 188—30)

This invention relates to a motor vehicle check, and has for the primary object the provision of a safety device which will automatically prevent a vehicle from rolling backwards on a grade or held after the forward motion thereof has stopped and which will automatically release the vehicle for forward motion when power is applied to propel the vehicle in the last-mentioned direction.

Another object of the invention is the provision of means for rendering the device inoperative or for maintaining the same in a releasing position when it is desired to back the vehicle by its power plant.

With these and other objects in view this invention consists in certain novel features of construction, combination and arrangement of parts to be hereinafter more fully described and claimed.

For a complete understanding of my invention, reference is to be had to the following description and accompanying drawing.

In the drawing:

Figure 1 is a front elevation, partly in section, illustrating a vehicle check constructed in accordance with the invention.

Figure 2 is a vertical sectional view illustrating the same.

Figure 3 is a plan view illustrating the rotatable or fixed plate of the check.

Figure 4 is a fragmentary plan view illustrating the non-rotatable plate of the check.

Figure 5 is a fragmentary sectional view of the rotatable plate illustrating the blades thereof.

Referring in detail to the drawing, the numeral 1 indicates a housing fixed to the transmission housing 2 of a vehicle and having the propeller shaft 3 extending therethrough. While the housing 1 is shown fixed to the transmission housing it is to be understood that the housing 1 may be secured to some other part of the vehicle. The housing is adapted to contain a fluid such as oil or any other lubricant and the top wall is provided with an opening closed by a cover 4 providing a seat for a shifting fork 5.

A circular plate 6 is fixed to the housing 1 with the propeller shaft extending therethrough and is provided with an annular arrangement of ratchet teeth 7. A disc or plate 8 is splined to the propeller shaft 3 and its face next to the plate 6 has formed thereon annularly arranged ratchet teeth 8' for meshing engagement with the ratchet teeth 7 during the attempted rotation of the shaft 3 in one direction. The plate 8 has formed thereon blades 9 extending angularly to one face of the plate and the latter is provided with openings 10 between the blades. The blades during the rotation of the plate 8 by the propeller shaft 3 is adapted to act on the fluid and the latter offer a drag to the plate 8. A coil spring 11 is mounted on the shaft 3 between a wall of the housing 1 and the plate 8 and is adapted to normally urge the plate 8 towards the plate 6, causing the ratchet teeth to engage.

In operation, the propeller shaft 3 during the forward motion of the vehicle rotates in the direction indicated by the arrow in Figure 2 of the drawing and the plate being splined to the propeller shaft rotates therewith with blades acting upon the fluid. The blades acting on the fluid causes a longitudinal movement of the plate 8 away from the plate 6. The stopping of the vehicle discontinues the rotation of the propeller shaft and the spring 11 moves the plate 8 longitudinally towards the plate 6, meshing the teeth thereof with the teeth of the plate 6 bringing about a locking of the propeller shaft in a direction reverse to the direction indicated by the arrow. The locking of the shaft prevents a reverse or backward movement of the vehicle.

The shifting fork 5 which is pivotally connected to the plate 8 may be suitably connected with the usual shifting lever of the transmission of the vehicle so that when the shifting lever is positioned to reverse the motion of the vehicle, the shifting fork will be moved to slide the plate 8 longitudinally away from the plate 6.

A device of the character described and shown provides a safety device for a vehicle by preventing the vehicle from rolling backwards on a grade when the vehicle has been brought to a stop and the device is so designed that it automatically releases the vehicle for forward motion when the power is applied to drive the vehicle in the last stated direction.

While I have shown and described the preferred embodiment of my invention it will be understood that minor changes in construction, combination and arrangement of parts may be made without departing from the spirit and scope of my invention, as claimed.

Having described the invention, I claim:

1. A vehicle check comprising a fixed housing containing fluid and having a propeller shaft of a vehicle extending therethrough, a fixed ratchet plate in said housing, a movable ratchet plate in the housing and splined to the propeller shaft, means for urging the movable ratchet plate into engagement with the fixed ratchet plate, and means on the movable ratchet plate to engage the fluid for causing said movable ratchet plate to move longitudinally away from the fixed ratchet plate by the rotation of the shaft in one direction.

2. A vehicle check comprising a fixed housing containing fluid and having a propeller shaft of a vehicle extending therethrough, a fixed ratchet plate in said housing, a movable ratchet plate in the housing and splined to the propeller shaft, means for urging the movable ratchet plate into engagement with the fixed ratchet plate, and blades on the movable ratchet plate to act on the fluid during the rotation of the propeller shaft in one direction for moving said movable ratchet plate away from the fixed ratchet plate.

3. A vehicle check comprising a fixed housing containing fluid and having a propeller shaft of a vehicle extending therethrough, a fixed ratchet plate in said housing, a movable ratchet plate in the housing and splined to the propeller shaft, means for urging the movable ratchet plate into engagement with the fixed ratchet plate, blades on the movable ratchet plate to act on the fluid during the rotation of the propeller shaft in one direction for moving said movable ratchet plate away from the fixed ratchet plate, said movable ratchet plate having slots arranged between the blades.

4. A vehicle check comprising a fixed housing containing a fluid and having a propeller shaft of a vehicle extending therethrough, a fixed ratchet plate in said housing, a movable ratchet plate in the housing and splined to the propeller shaft, means for urging the movable ratchet plate into engagement with the fixed ratchet plate, blades on the movable ratchet plate to act on the fluid during the rotation of the propeller shaft in one direction for moving said movable ratchet plate away from the fixed ratchet plate, said movable ratchet plate having slots arranged between the blades, and a manually controlled means for moving and retaining the movable ratchet plate out of engagement with the fixed ratchet plate.

HARRY W. OTIS.